United States Patent [19]

Davies

[11] 4,180,380

[45] Dec. 25, 1979

[54] ELECTRICAL CONTROLS FOR HEATING APPLIANCES

[75] Inventor: Ronald W. Davies, Birkenhead, England

[73] Assignee: United Gas Industries Limited, London, England

[21] Appl. No.: 783,810

[22] Filed: Apr. 1, 1977

[30] Foreign Application Priority Data

Apr. 13, 1976 [GB] United Kingdom ............... 14998/76
Dec. 2, 1976 [GB] United Kingdom ............... 50250/76

[51] Int. Cl.² .................................................. F23H 5/00
[52] U.S. Cl. ......................................... 431/31; 431/78
[58] Field of Search ........................... 431/24–26, 431/31, 46, 71–74, 78–80, 121

[56] References Cited

U.S. PATENT DOCUMENTS

| | | | |
|---|---|---|---|
| 3,376,099 | 4/1968 | Giuffrida | 431/26 |
| 3,449,055 | 6/1969 | Blackett | 431/46 |
| 3,482,922 | 12/1969 | Blackett | 431/26 |
| 3,574,495 | 4/1971 | Landis | 431/26 |
| 3,644,074 | 2/1972 | Cade | 431/46 |
| 3,814,569 | 6/1974 | Jacobsz | 431/26 |
| 3,840,322 | 10/1974 | Cade | 431/78 |
| 4,113,419 | 9/1978 | Cade | 431/78 |

*Primary Examiner*—Carroll B. Dority, Jr.
*Attorney, Agent, or Firm*—Larson, Taylor and Hinds

[57] ABSTRACT

This invention relates to a particularly safe electrical control device for a gas or oil-fired heating appliance comprising a plurality of sub-circuits each carrying out part of a start-up sequence for the appliance, and arranged so that should any sub-circuit fail, the start-up sequence ceases.

Parts of the control device are similar to those shown in British Patent Specification No. 1,314,185. (U.S.Pat. No. 3,674,410).

4 Claims, 1 Drawing Figure

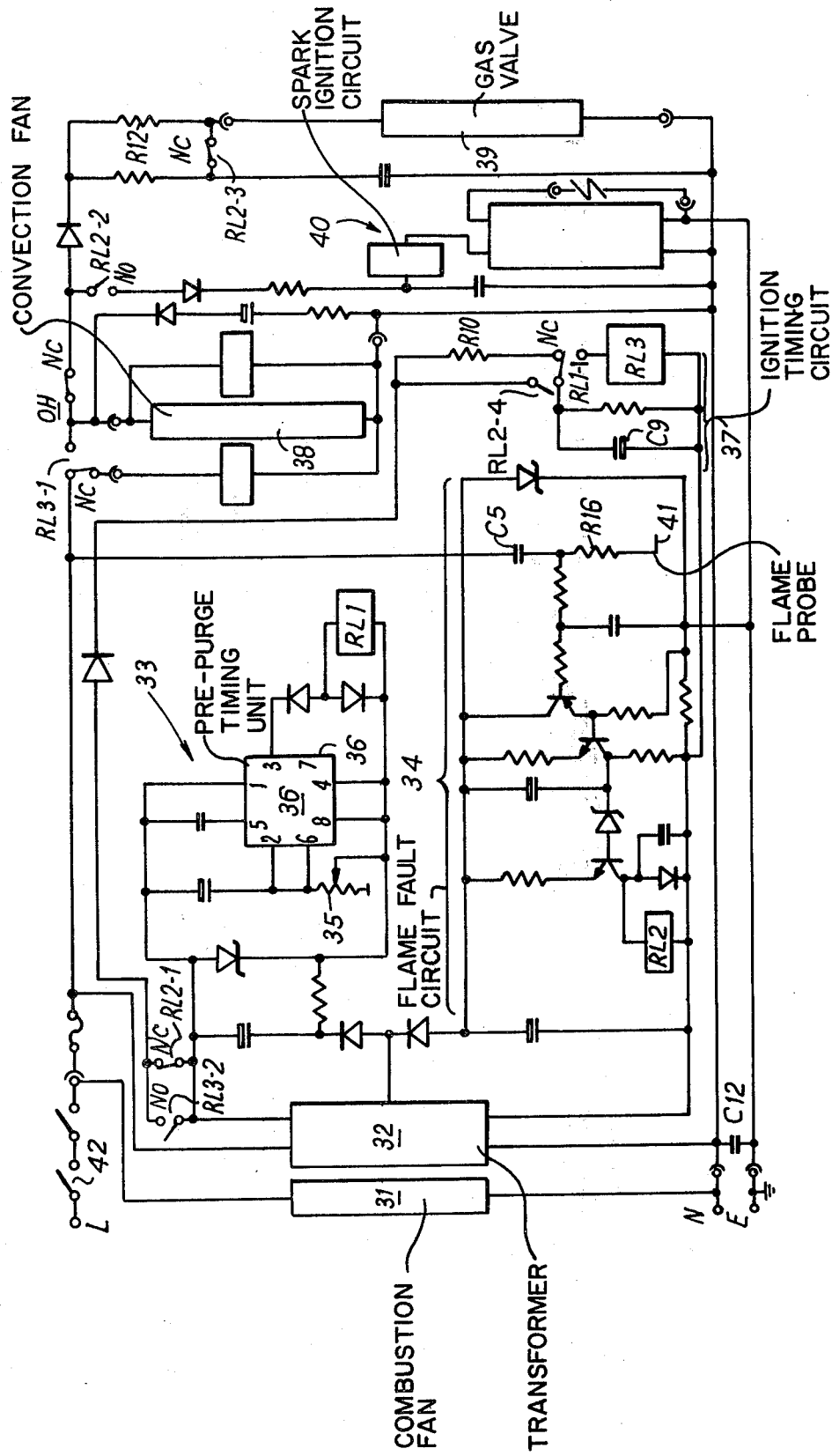

ELECTRICAL CONTROLS FOR HEATING APPLIANCES

This invention relates to electrical controls for heating appliances, particularly to controls providing safety features.

The invention provides an electrical control device for a gas or oil-fired appliance of the kind having a combustion fan, an electrically-operated fuel valve and an ignition device, said control device including a first switch means controlled by time delay means, second switch means in series with said first switch means and for connection in series with said ignition device, and third switch means controlling a circuit for connection between the first switch means and the fuel valve, said second and third switch means being controlled by a flame-sensing device, whereby said ignition device and fuel valve may only be operated at a time determined by said time delay means and when no flame is sensed by said flame-sensing device.

The said third switch means may connect a resistance in series with the fuel valve, whereby when said resistance is so connected the current supply to the fuel valve is reduced to a value sufficient to maintain the fuel valve open but insufficient to open it from the closed position. The resistance may be so connected when the flame-sensing device senses a flame.

The time delay means may control the said first switch means so as to prevent operation of both the ignition device and the fuel valve for a first timed period during which period the combustion fan is running.

The single FIGURE in the drawings is a circuit diagram of a preferred embodiment of the invention.

The control device illustrated in the drawing is for a gas-fired heater of the kind having a combustion fan 31, supplying air for combustion and a convection fan 38 driving air through a heat exchanger. This control device operates on starting to run the combustion fan only for a short period before a gas valve is opened and an ignition device operated, so that the system is first purged of any potentially explosive mixture. It also operates to close down the system if, after another period after the ignition device is operated, the gas has not ignited. In the drawings, switches which are normally opened, i.e., open on start up, are marked NO while switches which are normally closed are marked NC.

When control switches 42 call for heat, the combustion fan 31 and a transformer 32 are energized. The low-volt side of the transformer then energizes a pre-purge timing unit 33. The timing unit 33 includes an integrated circuit 36 and operates a relay RL1 after a predetermined time delay e.g. of a few seconds. The delay period may be adjusted by means of adjustable rheostat 35.

The output of the transformer is also applied via a normally-closed switch RL2-1 and a resistance R10 to an ignition timing circuit 37 which includes a two-position switch RL1-1. A capacitor C9 in circuit 37 is thereby initially charged. Switch RL1-1 is controlled by the relay RL1 in pre-purge timing unit 33 so that at the end of the purge period switch RL1-1 disconnects from resistance R10 and puts a relay RL3 into a small circuit with C9. Relay RL3 is pulled in by the charge on C9 and two switches RL3-1 and RL3-2 are operated. One switch RL3-1 makes circuits operating the convection fan 38, a gas valve 39 and, via a second normally closed switch RL2-2, a spark ignition circuit 40. The other, normaly open, switch RL3-2 provides a by-pass to the first seitch RL2-1 for the circuit 37 as described hereinafter.

A flame failure circuit 34 is energized from the mains so that it is operative at all times, and has a flame probe 41 located to detect when a flame has been established. Capacitor C5 and resistor R16 guard against the probe becoming dangerous if touched. The circuit comprises a three-stage amplifier causing the low energy output from the probe to operate a relay RL2. This relay operates four switches RL2, two of which have already been mentioned, and the third RL2-3 of which when open places a resistance RL2 in series with the gas valve. When a flame is sensed the first switch RL2-1 opens, the second switch RL2-2 also opens so open-circuiting the spark ignition circuit 40, and the third switch RL2-3 opens to place resistance RL2 in series with the gas valve. In this condition, if the gas valve is open it remains so but if it is not open, resistance RL2 is too large to allow sufficient energy supply to open the valve.

If therefore on starting a flame is present or there is a flame simulating fault, the switches RL2 are all open and the ignition timer does not operate, the spark ignition does not operate and the gas valve does not open Moreover relay RL3 is not energized.

If no flame is present on starting the three switches RL2-1, RL2-2 and RL2-3 described above are closed, allowing the ignition sequence described above to take place, until a flame is established. When this happens the three said switches described above open but a fourth, normally open switch RL2-4 closes, providing power to circuit 37. When the circuit 37 is re-energized relay RL3 is held in. The gas valve and convection fan 38 therefore remain energized until RL3 drops out when the appliance is switched off.

If after the period chosen for the ignition timer 37 no flame has been established, the capacitor C9, which is discharging through relay RL3 allows the relay RL3 to drop out. This operates the RL3-1 switch which stops the supply to the convection fan 38, the ignition circuit 40 and the gas valve. The appliance is therefore effectively made safe.

This circuit has been designed particularly for operation under adverse conditions e.g. with variable mains supply, and for different wiring systems. For example capacitor C12 enables the circuit to be safely connected to a 2-wire (no separate earth wire) system. The operation of the convection fan 38 after the purge period avoids the fan blowing cold air initially as would happen were it connected to operate with the combustion fan.

The control logic is based on the three circuits 33, 34, 37 each of which controls a relay RL1, RL2 and RL3 respectively. Failures in the circuits may therefore be equated with the failure of any of these relays to operate correctly, and may therefore be reduced to a consideration of three relay failures only. Considering each of these in turn, as the appliance is started, which is the most hazardous operation which happens in a gas appliance.

If relay RL1 fails and is in the operated condition when the appliance is started, then switch RL1-1 in circuit 37 will be in the open position. Capacitor C9 will not therefore be charged and relay RL3 will never operate. Accordingly switch RL3-1 remains closed and no power supply is made to the ignition circuit nor is the main gas valve opened.

If relay RL2 fails and indicates falsely that a flame is in existence when the appliance is started, then switch RL2-1 is open so there is no power supply to the ignition timer 37, so relay RL3 never operates and switch RL3-1 never opens to supply power to the ignition circuit nor is the main gas valve opened. Furthermore, switch RL2-3 is open so the resistance RL2 is connected in the gas valve circuit, said switch RL2-2 is open so that even if switch RL3-1 were operated there would still be no operation of the gas valve or ignition circuit.

If relay RL3 fails and remains pulled in, then switch RL3-1 is open and a power is available to both the ignition circuit and the gas valve. If therefore the flame failure circuit is operating correctly, the appliance will start normally but without the safety features of the pre-purge period and the timed ignition period. Although in such a failure some safety is lost, the type of explosion due to ignition of residual gas in the appliance at start-up is not of the most severe kind, and the appliance is not therefore considered to be hazardous. If the relay RL3 fails in the un-operated condition then switch RL3-1 remains closed and no power is available to either the ignition circuit or the gas valve.

For an explosion of the most severe kind to occur, it is necessary for two simultaneous and specific failures to occur. The gas valve must be open while the ignition circuit is not operating, so that a large build-up of gas occurs. This can happen if both the ignition circuit fails and relay RL3 fails in the pulled-in condition, the likelihood of such simultaneous failure being low.

I claim:

1. A gas or oil-fired appliance having a combustion air fan, and electrically-operated fuel valve, an ignition device and a control circuit comprising a plurality of electrical sub-circuits each adapted to carry out and/or monitor part of a start-up sequence of a timed purge period followed by a timed ignition period followed either by normal operation or by a close-down operation if a flame is not detected, each said sub-circuit having a relay connected to operate switching devices for effecting the appropriate part of the start-up sequence, and one of said sub-circuits having timing means for timing the ignition period and comprising an ignition timer relay and a capacitor connected to discharge through said relay until the capacitor is discharged, the said switching devices for said one sub-circuit being connected to be operated by said ignition timer relay and to maintain the fuel valve open and the ignition device operative during said ignition period, a second one of said sub-circuits having means for detecting the occurrence of a flame and including a flame-detector relay connected to operate the said switching devices for said second sub-circuit, one of which switching devices connects an alternative power supply to maintain said ignition timer relay operated after said ignition period when a flame is detected, and said combustion fan being connected to be energized on start-up independently of any of said relay-operated switching devices of the control circuit.

2. An appliance as claimed in claim 1, in which another of the switching devices connected to be operated by the flame-detector relay is arranged to disconnect the ignition device on the detection of a flame.

3. An appliance as claimed in claim 2, in which another of the switching devices connected to be operated by the flame-detector relay is arranged to place a resistance in series with the fuel valve on the detection of a flame.

4. A gas or oil-fired appliance having a combustion air fan, a convection air fan, an electrically-operated fuel valve, an ignition device and a control device comprising a plurality of electrical sub-circuits each for carrying-out and/or monitoring part of the start-up sequence of a timed purge period followed by a timed ignition period followed by either normal operation or by a close-down operation if a flame is not detected, each said sub-circuit having a relay connected to operate switching devices for effecting the appropriate part of the start-up sequence, said combustion air fan being connected to be energized on start-up independently of any of said relay-operated switching devices, and said convection air fan being connected through a switching device controlled by that one of said sub-circuits which controls the timed ignition periods.

* * * * *